(12) United States Patent
Rose et al.

(10) Patent No.: US 8,219,379 B2
(45) Date of Patent: Jul. 10, 2012

(54) SYSTEM, METHOD AND COMPUTER PROGRAM PRODUCT FOR TESTING SOFTWARE

(75) Inventors: Andrew Christopher Rose, Cambridge (GB); Andrew James Bolt, Cambridge (GB); Donald Robert Sinclair, Cambridge (GB)

(73) Assignee: ARM Limited, Cambridge (GB)

( * ) Notice: Subject to any disclaimer, the term of this patent is extended or adjusted under 35 U.S.C. 154(b) by 2109 days.

(21) Appl. No.: 10/998,178

(22) Filed: Nov. 29, 2004

(65) Prior Publication Data

US 2006/0129765 A1    Jun. 15, 2006

(51) Int. Cl.
G06F 9/45     (2006.01)
G06F 13/00    (2006.01)
G06F 9/46     (2006.01)
G06F 9/455    (2006.01)

(52) U.S. Cl. .......... 703/22; 711/133; 711/158; 711/159; 718/103; 712/227

(58) Field of Classification Search ..................... 703/22; 711/133, 158–159; 718/103; 712/227
See application file for complete search history.

(56) References Cited

U.S. PATENT DOCUMENTS

| | | | | |
|---|---|---|---|---|
| 5,657,472 A * | 8/1997 | Van Loo et al. | ............... | 711/158 |
| 5,794,012 A * | 8/1998 | Averill | ............... | 703/21 |
| 5,838,948 A * | 11/1998 | Bunza | ............... | 703/27 |
| 5,845,292 A * | 12/1998 | Bohannon et al. | ............... | 707/202 |
| 5,893,165 A * | 4/1999 | Ebrahim | ............... | 711/158 |
| 5,905,998 A * | 5/1999 | Ebrahim et al. | ............... | 711/144 |
| 6,260,131 B1 * | 7/2001 | Kikuta et al. | ............... | 711/210 |
| 6,263,302 B1 * | 7/2001 | Hellestrand et al. | ............... | 703/17 |
| 6,571,373 B1 * | 5/2003 | Devins et al. | ............... | 716/5 |
| 6,584,436 B2 * | 6/2003 | Hellestrand et al. | ............... | 703/13 |
| 6,751,583 B1 * | 6/2004 | Clarke et al. | ............... | 703/17 |
| 6,807,522 B1 * | 10/2004 | Orfali | ............... | 703/22 |
| 6,859,892 B2 * | 2/2005 | Bolding et al. | ............... | 714/34 |
| 7,016,826 B2 * | 3/2006 | Wheeler et al. | ............... | 703/19 |
| 7,260,517 B2 * | 8/2007 | Bailey et al. | ............... | 703/27 |
| 7,996,615 B2 * | 8/2011 | Galchev et al. | ............... | 711/119 |
| 2002/0019969 A1 * | 2/2002 | Hellestrand et al. | ............... | 716/5 |
| 2003/0237076 A1 * | 12/2003 | Tormey et al. | ............... | 717/135 |
| 2005/0210335 A1 * | 9/2005 | Muratori et al. | ............... | 714/35 |
| 2006/0195821 A1 * | 8/2006 | Vanspauwen et al. | ............... | 717/124 |
| 2007/0011656 A1 * | 1/2007 | Kumamoto | ............... | 717/124 |

OTHER PUBLICATIONS

Definition: Memory management unit—From Wikipedia, http://en.wikipedia.org/wiki/Memory_Management_Unit Dated Jul. 7, 2007.*
Definition: Memory barrier—From Wikipedia, http://en.wikipedia.org/wiki/Memory_barrier Dated: Aug. 21, 2007.*

* cited by examiner

Primary Examiner — Kamini S Shah
Assistant Examiner — Akash Saxena
(74) Attorney, Agent, or Firm — Nixon & Vanderhye P.C.

(57) ABSTRACT

Software is tested for execution on data processing apparatus with plural processors that share access to a memory. The memory has a memory ordering type specifying an ordering freedom which allows memory access requests to be processed out of order from an original program order. A simulator for each processor executes a sequence of instructions in program order. An access buffer associated with one of the processor simulators receives and stores access requests issued by that simulator when executing access instructions within the sequences. A controller selects and applies an eviction policy to determine an order in which access requests are output from the access buffer to the memory so that the ordering freedom is exercised in a manner compliant with the memory ordering type but to a degree exceeding that expected within the data processing apparatus.

21 Claims, 8 Drawing Sheets

| | | TEST S/W | | |
|---|---|---|---|---|
| | | RELIES ON SO MODEL, FAILS ON TSO AND WO | RELIES ON TSO MODEL, FAILS ON WO | RELIES ONLY ON WO |
| EVICTION POLICY | NO STORE BUFFERS | PASS | PASS | PASS |
| | DRAIN ALL BUFFERS IN ORDER | FAIL | PASS | PASS |
| | DRAIN NORMAL MEMORY BUFFER IN ASCENDING MEMORY ADDRESS ORDER | FAIL | FAIL | PASS |
| | DRAIN NORMAL MEMORY BUFFER IN DESCENDING MEMORY ADDRESS ORDER | FAIL | FAIL | PASS |
| | DRAIN NORMAL MEMORY BUFFER PSEUDO RANDOMLY | FAIL | FAIL | PASS |

FIG. 5

EXAMPLE PROGRAM SEQUENCE

| PROCESSOR A | PROCESSOR B |
|---|---|
| . | . |
| . | . |
| . | . |
| STR PAYLOAD | POLL PLVALID |
| STR PLVALID | READ PAYLOAD |

STRONGLY ORDERED MEMORY : PROGRAM SEQUENCE OPERATES CORRECTLY

WEAKLY ORDERED MEMORY : PROGRAM SEQUENCE MAY OPERATE INCORRECTLY SINCE PROCESSOR A MAY REVERSE ORDER OF STR INSTRUCTIONS

FIG. 8

SYSTEM, METHOD AND COMPUTER PROGRAM PRODUCT FOR TESTING SOFTWARE

FIELD OF THE INVENTION

The present invention relates to a system, method and computer program product for testing software, and in particular for testing software to be run on a multi-processor system.

BACKGROUND

One known type of multi-processing system is the Symmetric Multi-Processing (SMP) system, in which multiple processors share memory. When developing software to run on a data processing apparatus, it is known to model the elements of the data processing apparatus as a software model, and then to run the software on that software model in order to test the operation of the software. Such an approach is often used where the software and hardware are being developed in parallel, and the software developers do not wish to wait until the hardware is finalised before being able to test the software being developed. By allowing an earlier testing of the software on the software model, certain potential problems with the software can be detected earlier than would otherwise be possible.

Within such a software model, the function of a processor can be modelled using an Instruction Set Simulator (ISS). Typically, an ISS is designed to replicate the function of a particular processor. However, such an ISS will typically execute each instruction atomically, and will not implement pipelining techniques. Hence, whilst an ISS can accurately replicate the function of a processor, it will not typically replicate accurately the timing that will be observed within the real processor being modelled by the ISS.

Within an SMP data processing apparatus, the memory system shared by the plurality of processors will typically be coherent memory, hence ensuring that the multiple processors see a consistent view of memory. However, the question of how consistent the view of that shared memory must be is dictated by the consistency model employed within the data processing apparatus. The consistency model sets out certain constraints which define when a processor must see a value that has been updated by another processor. A software program will define an original ordering of instructions, and the consistency model identifies what freedom the processor has to change that ordering. When considering the effects of different consistency models, consideration can be given to the orderings among read and writes performed by a single processor that are preserved by each consistency model. There are four such orderings:
1. R→R: a read followed by a read.
2. R→W: a read followed by a write, which is always preserved if the operations are to the same address, since this is an antidependence.
3. W→W: a write followed by a write, which is always preserved if they are to the same address, since this is an output dependence.
4. W→R: a write followed by a read, which is always preserved if they are to the same address, since this is a true dependence.

When employing a "strong ordering" consistency model (also referred to as a "sequential" consistency model), all four of the above orderings must be preserved, and this is hence equivalent to assuming a single centralised memory module that serialises all processor operations. Because ISSs typically execute each instruction in order and atomically, a software model of an SMP data processing apparatus will inherently apply a strongly-ordered consistency model.

However, the real SMP data processing apparatus being modelled will often employ a more relaxed consistency model, with the aim of enabling a performance gain to be realised. For example, a total store ordering (TSO) consistency model relaxes the ordering between a write and a read, hence eliminating the order W→R. Such models allow the buffering of writes with bypassing by reads, which occurs whenever the processor allows a read to proceed before it guarantees that an earlier write by that processor has been seen by all of the other processors. This consistency model allows a machine to hide some of the latency of a write operation.

If in addition non-conflicting writes are allowed to potentially complete out of order, by relaxing the W→W ordering, then the data processing apparatus is said to use a partial store ordering (PSO) consistency model. From an implementation view point, this allows pipelining or overlapping of write operations, rather than forcing one operation to complete before another.

Another major class of relaxed models eliminates the R→R and R→W orderings, in addition to the other two orders mentioned above. This model, which is called a weak ordering consistency model, does not preserve ordering among references, except for certain synchronisation operations. Although the R→R and R→W orderings are eliminated, the processor can only take advantage of this if it has non-blocking reads. In general, the major advantage of all weaker consistency models comes in hiding write latencies rather than read latencies.

A typical SMP data processing apparatus will implement a more relaxed memory consistency model than the earlier mentioned strongly ordered consistency model. Whilst testing of the software on the software model of the SMP apparatus will enable certain problems to be identified with the software, it will not enable any bugs to be identified which stem from incorrectly assuming a particular behaviour of memory consistency, when this is not appropriate having regard to the intended SMT apparatus. As an example, it may be the case that certain particular sequences within the software will only reliably execute correctly if a strongly ordered consistency model is present, and may occasionally operate incorrectly with any more weakly ordered consistency model. Such a bug would not typically be detected when running the software on a software model employing ISSs for each of the processors, due to the fact that those ISSs are inherently strongly ordered.

In general, such bugs arising from an incorrect assumption of a particular behaviour of memory ordering are very hard to detect and difficult to provoke. Accordingly, it would be desirable to provide an improved system for testing software to be run on an SMP data processing apparatus.

SUMMARY

Viewed from a first aspect, the present invention provides a test system for testing software to be run on a data processing apparatus having a plurality of processors operable to share access to a memory system, at least a part of the memory system having a memory ordering type which allows memory access requests to that part to be processed out of order from an original program order, the test system comprising: a processor simulator for each processor of the data processing apparatus, each processor simulator being operable to execute a sequence of instructions in program order; at least one access buffer unit, each access buffer unit being associated with one of the processor simulators and being operable to receive memory access requests issued by that processor simulator when executing memory access instructions within the sequence of instructions; each access buffer unit comprising: at least one buffer operable to store memory access requests issued by the associated processor simulator; and a controller operable to apply an eviction policy to determine an order in which the memory access requests are output from the access buffer unit to the memory system; the eviction policy being configurable such that the memory ordering type of said part of the memory system is exercised to a degree exceeding that expected within the data processing apparatus, in order to seek to provoke an occurrence of any bug in the software resulting from an assumption of memory ordering which is not appropriate for the data processing apparatus.

At least one access buffer unit is provided within the test system, each access buffer unit being associated with one of the processor simulators. Each access buffer unit is operable to receive memory access requests issued by its associated processor simulator when that simulator executes memory access instructions, with each access buffer unit comprising at least one buffer for storing memory access requests issued by the associated processor simulator. It should be noted that the buffer(s) within the access buffer unit may be arranged to store all memory access requests received by the associated processor simulator, or only a selected subset of memory access requests, for example those memory access requests directed to particular memory regions. Further the buffer(s) may be arranged to store only certain access types, for example write accesses.

Each access buffer unit further has a controller which applies an eviction policy to determine an order in which the memory access requests are output from the access buffer unit to the memory system. In accordance with the present invention, this eviction policy is configurable such that the memory ordering type of a part of the memory system that allows out of order processing of memory access requests is exercised to a degree exceeding that expected within the data processing apparatus being modelled, in order to seek to provoke an occurrence of any bug in the software resulting from an assumption of memory ordering which is not appropriate for the data processing apparatus.

The "degree" to which the memory ordering type of the above mentioned part of the memory system is exercised can exceed that expected within the data processing apparatus in terms of the frequency at which a particular freedom (for example the ability to alter the ordering of two read instructions) is exercised, and/or the amount of types of freedom that are exercised.

Hence, due to the configurable nature of the eviction policy applied by the controller, it is possible to aggressively exercise the relaxation of the memory consistency allowed with respect to a particular part of the memory system beyond that which would normally be experienced, so as to more readily provoke an occurrence of any bug in the software resulting from an incorrect assumption of memory ordering. It should be noted that the test system remains compliant with the relevant consistency model at all times, but as far as the software being executed by that test system is concerned, the test system is able to move to very aggressive corners of the consistency model, i.e. either exercising the ordering freedom(s) supported by that consistency model more so than in a typical implementation, or more reliably than in a typical implementation.

In one example embodiment, the eviction policy is configurable so as to allow various types of memory ordering to be implemented including the memory ordering type of said part of the memory system of the data processing apparatus. In addition, as mentioned earlier, the configurability also allows freedom within a given memory ordering type to move to different corners of the type. Hence, purely by way of example, the memory ordering type of the above-mentioned part of the memory system may be "weakly ordered" and the present invention will allow the configurability of the eviction policy so that that weakly ordered consistency model is exercised aggressively. However, in addition, in the above mentioned embodiment of the present invention, the eviction policy is also configurable to allow various other types of memory ordering to be implemented, such as the earlier-mentioned TSO and PSO consistency models.

The access buffer unit may be arranged to buffer either read accesses or write accesses, dependent on the embodiment. However, in one embodiment, the access buffer unit is a store buffer unit and is operable to store selected write memory access requests within the at least one access buffer.

In one example embodiment, the memory system has a plurality of parts having different memory ordering types, each of said at least one buffers within each access buffer unit being associated with a particular one of said memory ordering types and being operable to store memory access requests issued to a part of the memory system having that associated memory ordering type. Hence, as an example, some parts of the memory may be strongly ordered, some parts of the memory may be weakly ordered, some parts of the memory may employ a TSO consistency model, some parts of the memory may employ a PSO consistency model, etc. Each buffer within the access buffer unit is associated with one of the memory ordering types applicable to the memory system, but there is no requirement for a buffer to be provided for every memory ordering type applicable to the memory system.

As an example, in one embodiment, the memory ordering type of a first part of the memory system is strongly ordered, and no buffer is provided within the access buffer unit for that first part of the memory system, the controller being operable to evict the memory access requests in the at least one buffers before a memory access request to the first part of the memory system is processed. Hence, in accordance with this embodiment, if a memory access request to the first part of the memory system is received by the access buffer unit, the access buffer unit is arranged to drain the contents of all of its buffers before allowing the memory access request to the memory system to be output to the memory system.

The number of access buffer units provided within the test system can be varied, dependent on the embodiment. However, in one example embodiment, an access buffer unit is provided for each processor simulator.

It is generally envisaged that there will be a number of events which trigger the eviction of one or more memory access requests from the buffer(s) of each access buffer unit. As an example, each access buffer unit may be arranged to periodically evict memory access requests from its buffers, whilst in addition certain specific events, such as the earlier mentioned receipt of a memory access request to a strongly ordered part of the memory system, may dictate the wholesale eviction of the contents of the buffers. In one embodiment, each access buffer unit comprises a plurality of buffers and the controller is operable when determining a memory access request to be evicted from the access buffer unit to select one of the buffers and to then apply the eviction policy to determine a memory access request to be evicted from that selected buffer, the degree of configurability of the eviction policy being dependent on the selected buffer.

In one particular embodiment, a first buffer is associated with a normal memory ordering type and the eviction policy is configurable to allow the memory access requests within that first buffer to be output to the memory system according to a variety of out of order schemes. The normal memory ordering type can be considered to operate in accordance with a weakly ordered consistency model. Accordingly, the eviction policy can be configured to perform a wide variety of out of order schemes.

In one example embodiment, a second buffer is associated with a device memory ordering type and the eviction policy requires the memory access requests within that second buffer to be issued in a First-In-First-Out (FIFO) order. Memory accesses to device memory must occur in program order with respect to other device memory accesses, but can be out of order with respect to other memory accesses.

Where an access buffer unit is used in association with a processor simulator, care needs to be taken when processing read access requests within the processor simulator. In particular, in one embodiment, each processor simulator associated with one of said at least one access buffer units is operable, when issuing a read memory access request, to check whether the data value to be read is stored within the associated access buffer unit, and if so to read the data value from the associated access buffer unit rather than issuing the read access request to the memory system.

Viewed from a second aspect, the present invention provides a method of testing software to be run on a data processing apparatus having a plurality of processors operable to share access to a memory system, at least a part of the memory system having a memory ordering type which allows memory access requests to that part to be processed out of order from an original program order, the method comprising the steps of: (a) for each processor of the data processing apparatus, employing a processor simulator to execute a sequence of instructions in program order; (b) providing at least one access buffer unit, each access buffer unit being associated with one of the processor simulators; (c) receiving at each access buffer unit memory access requests issued by the associated processor simulator when executing memory access instructions within the sequence of instructions; (d) within each access buffer unit: (i) storing within at least one buffer memory access requests issued by the associated processor simulator; and (ii) applying an eviction policy to determine an order in which the memory access requests are output from the access buffer unit to the memory system; (e) configuring the eviction policy such that the memory ordering type of said part of the memory system is exercised to a degree exceeding that expected within the data processing apparatus, in order to seek to provoke an occurrence of any bug in the software resulting from an assumption of memory ordering which is not appropriate for the data processing apparatus.

Viewed from a third aspect, the present invention provides a computer program product carrying a computer program which when executed on a computer implements a test system for testing software to be run on a data processing apparatus having a plurality of processors operable to share access to a memory system, at least a part of the memory system having a memory ordering type which allows memory access requests to that part to be processed out of order from an original program order, the computer program comprising: a processor simulation code portion operable to provide a processor simulator for each processor of the data processing apparatus, each processor simulator being operable to execute a sequence of instructions in program order; a buffer unit code portion operable to provide at least one access buffer unit, each access buffer unit being associated with one of the processor simulators and being operable to receive memory access requests issued by that processor simulator when executing memory access instructions within the sequence of instructions; each access buffer unit comprising: a buffer code portion operable to implement at least one buffer for storing memory access requests issued by the associated processor simulator; and a controller code portion operable to apply an eviction policy to determine an order in which the memory access requests are output from the access buffer unit to the memory system; the eviction policy being configurable such that the memory ordering type of said part of the memory system is exercised to a degree exceeding that expected within the data processing apparatus, in order to seek to provoke an occurrence of any bug in the software resulting from an assumption of memory ordering which is not appropriate for the data processing apparatus.

BRIEF DESCRIPTION OF THE DRAWINGS

FIG. 5 is a table illustrating whether a particular software being tested would pass or fail certain eviction policies;

FIG. 6 is a flow diagram illustrating the eviction process performed by a store buffer's controller in accordance with one example, non-limiting embodiment of;

FIG. 8 is diagram illustrating an example program sequence which may operate correctly for strongly ordered memory but incorrectly for weakly ordered memory.

DESCRIPTION OF PREFERRED EMBODIMENTS

Figure 1:
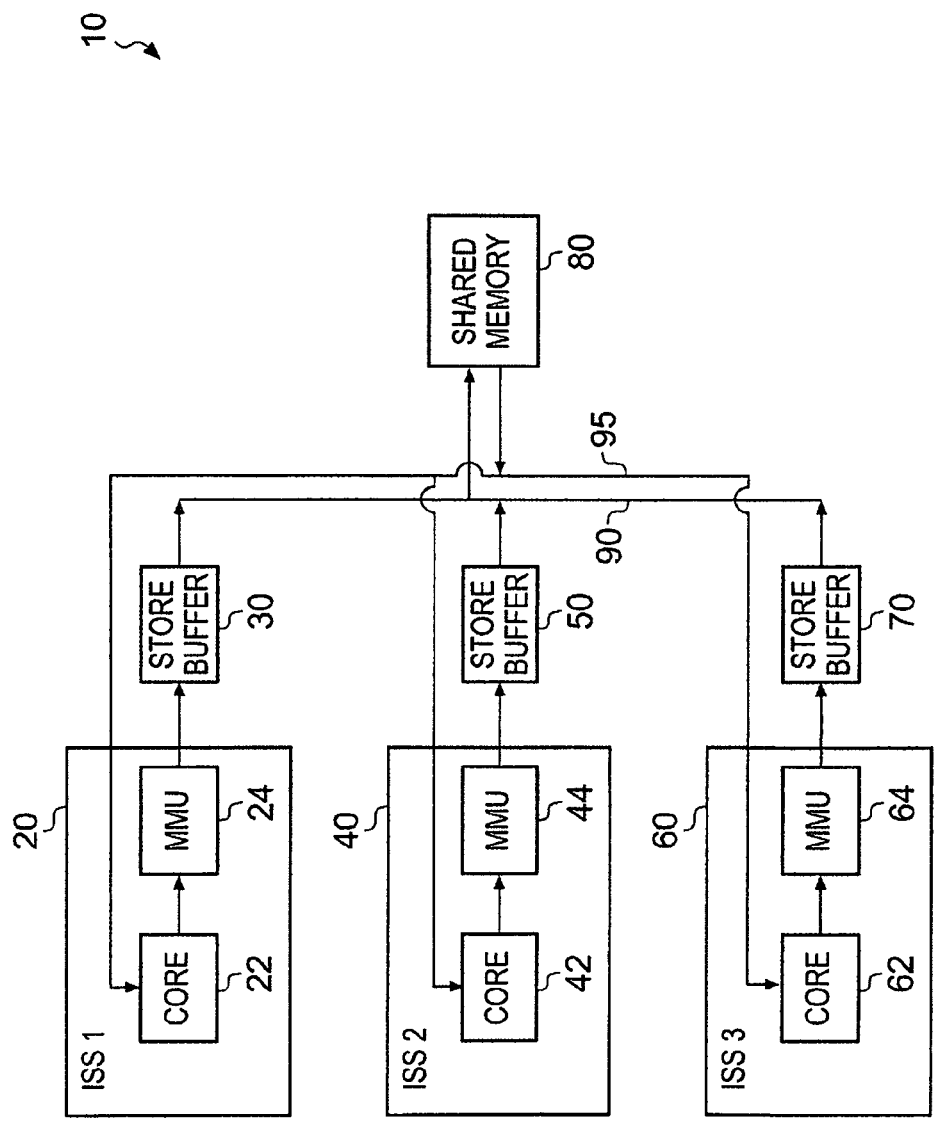
FIG. 1 is a block diagram illustrating a test system in accordance with one example non-limiting embodiment.

FIG. 1 is a block diagram schematically illustrating a test system (also referred to herein as a software model) used to replicate the function of an SMP data processing apparatus, such an SMP data processing apparatus having a plurality of processors operable to share access to a memory system. As shown in FIG. 1, the test system 10 includes a plurality of Instruction Set Simulators (ISSs) 20, 40, 60, one ISS being provided for each processor in the SMP apparatus being modelled. Each ISS 20, 40, 60 has a core simulator 22, 42, 62 for simulating the operations of the processor core of the corresponding processor, and a Memory Management Unit (MMU) simulator 24, 44, 64 for simulating the operations of an MMU provided within the processor being simulated. As will be appreciated by those skilled in the art, an MU performs various access verification steps before a memory access request is forwarded from the core to memory, and in addition typically performs conversion of a virtual address issued by the corresponding core to a physical address identifying a physical location within memory.

In the test system of preferred embodiments, such as that illustrated in FIG. 1, a store buffer 30, 50, 70 is provided in association with each ISS 20, 40, 60 for receiving the write memory access requests issued by the associated ISS and for re-ordering those write access requests where possible prior to issuing them over the write bus 90 to shared memory 80.

Read access requests are not routed via the store buffer 30, 50, 70, and hence read access requests will be forwarded directly from the relevant MMU 24, 44, 64 to the shared memory over a control bus (not shown), with the read data then being routed back to the relevant core 22, 42, 62 over the read data bus 95.

Figure 3:
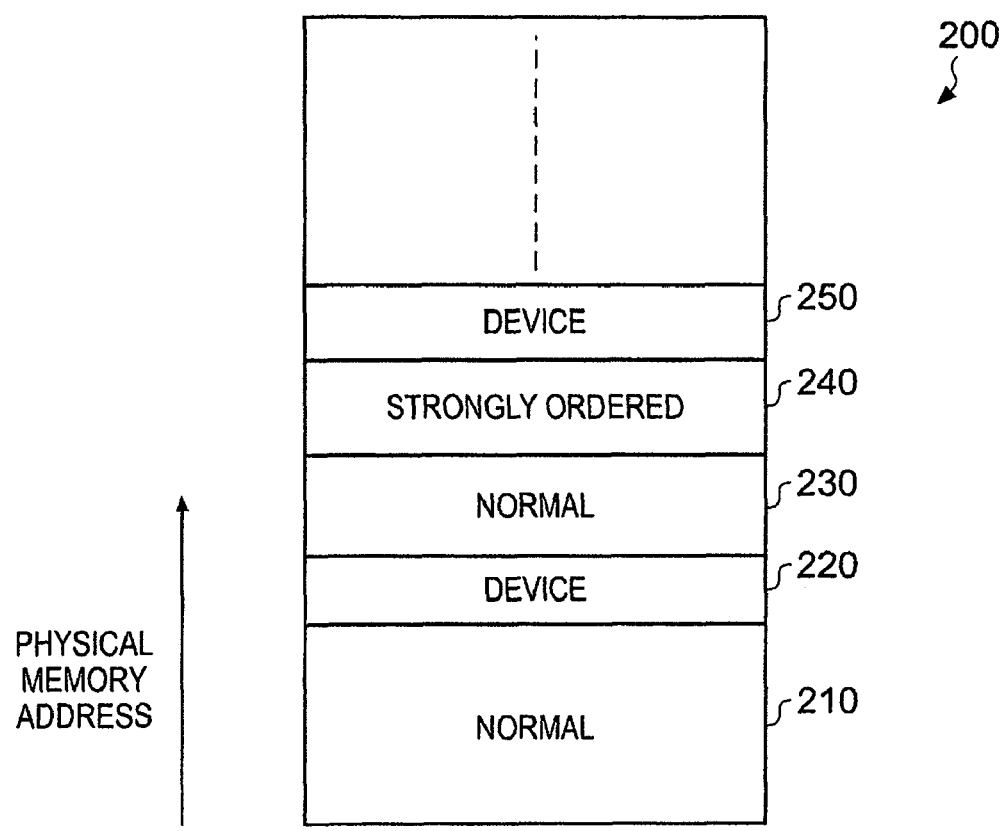
FIG. 3 is a diagram schematically illustrating the partitioning of physical memory into various regions.

As will be appreciated by those skilled in the art, the shared memory 80 will not typically consist of a single contiguous block of physical memory, but instead may comprise one or more layers of cache, with the physical memory being split between conventional memory blocks and pieces of memory provided within certain peripheral devices. Different parts of the memory system 80 may have different memory ordering types associated therewith, as is schematically illustrated in FIG. 3. Hence, with reference to FIG. 3, it can be seen that the entire available physical memory address space may be partitioned into a plurality of regions or parts, each region having a memory ordering type associated therewith. Hence, in the example of FIG. 3, the physical address space 200 contains normal regions 210, 230, device regions 220, 250, and a strongly ordered region 240. The consistency models applicable to these different regions will vary. For example, accesses to a normal memory region can occur in any order with respect to normal and device memory accesses. However, accesses to device memory regions must occur in program order with respect to other device memory accesses but can be out of order with respect to other accesses. Meanwhile, accesses to strongly ordered memory regions require all other memory accesses that are before them in program order to have completed, and a strongly ordered access must complete before any memory access after it can start.

The store buffers 30, 50, 70 of example embodiments enable these requirements to be met, but within the constraints of these requirements allow store memory access requests to be aggressively reordered in order to seek to provoke the occurrence of any bug in the software being tested that may result from an assumption of memory ordering that is not appropriate for the data processing apparatus on which that software is intended to run.

Figure 2:
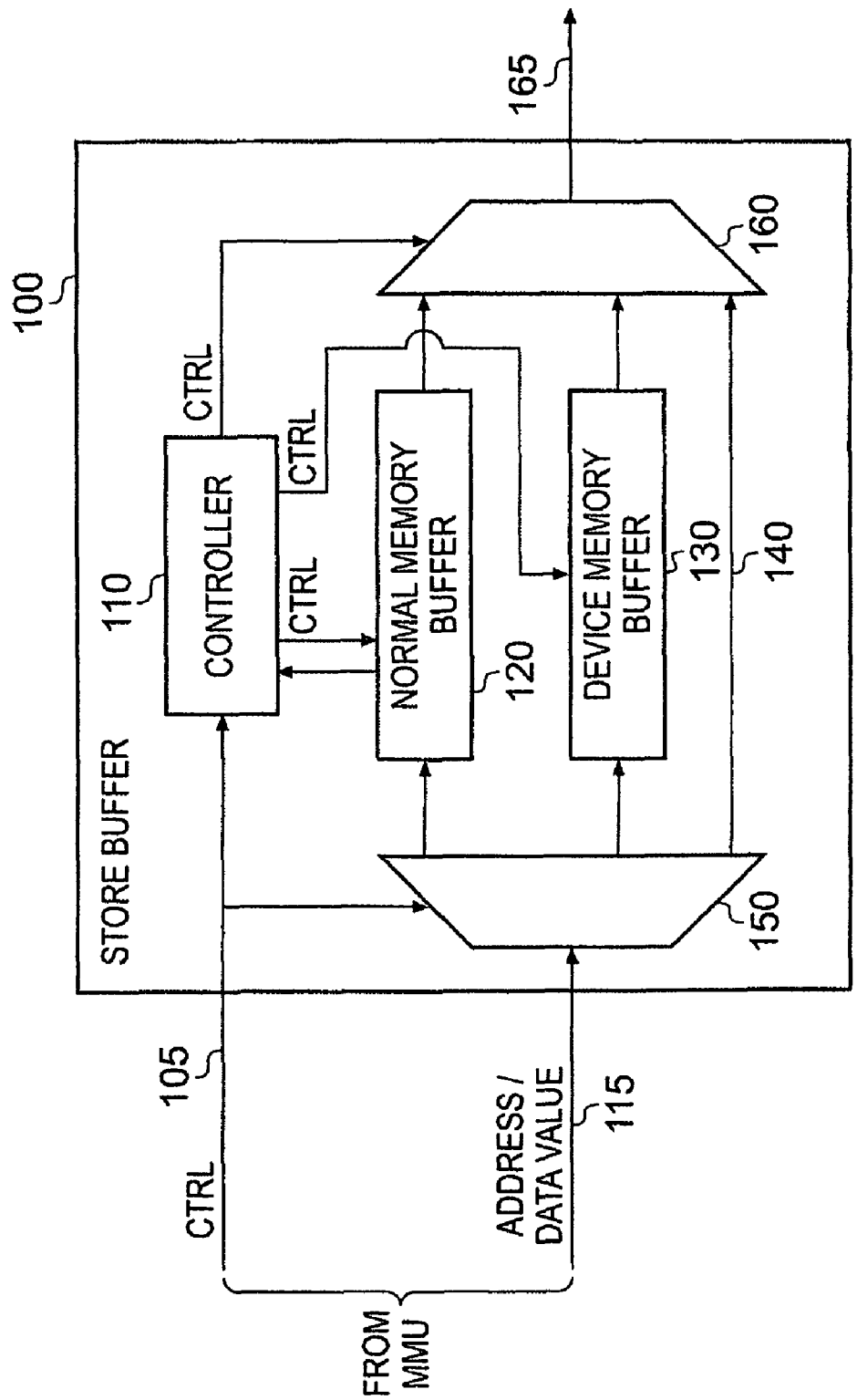
FIG. 2 is a block diagram illustrating the elements provided within a store buffer in accordance with one example, non-limiting embodiment.

The elements provided within the store buffer in accordance with one embodiment of the present invention is illustrated schematically in FIG. 2. The store buffer 100 contains two memory buffers, namely a normal memory buffer 120 and a device memory buffer 130. In addition, a controller 110 is provided for controlling the operation of these two buffers. When a write memory access request is issued by a particular ISS, its MMU will issue a control signal over path 105 to the store buffer 100, and will also route the address and its associated data value over path 115 to the store buffer. The address and data value are received by a demultiplexer 150 which receives as its control signal the control signal issued by the MMU over path 105, this control signal identifying whether the memory access request is being issued to a normal memory region, a device memory region, or a strongly ordered memory region. Based on this information, the demultiplexer 150 will route the address and data value to either the normal memory buffer 120, the device memory buffer 130, or directly over path 140 to a multiplexer 160.

The controller 110 controls the eviction of entries from the normal memory buffer 120 or the device memory buffer 130 dependent on a selected eviction policy, and also controls the operation of the multiplexer 160 to determine which memory access request is output over path 165 to the shared memory.

As mentioned earlier, device memory accesses must occur in program order with respect to other device memory accesses, and hence this means that the device memory buffer must drain in program order. Accordingly, the device memory buffer 130 is implemented as a First-In-First-Out (FIFO) buffer. There is no ordering requirement with respect to stores in the normal memory buffer 120 though. A device memory read access requires the device memory buffer 130 to drain before the read is allowed to take place.

Normal memory store operations can occur in any order with respect to normal and device memory stores. This means that the normal memory buffer 120 can drain in any order subject to certain constraints, and this will be discussed in detail later with reference to the flow diagram of FIG. 6.

Memory accesses to strongly ordered memory regions require all other memory accesses that precede them in program order to have completed, and this requires that both the normal memory buffer 120 and the device memory buffer 130 are drained before a strongly ordered access, whether that be a load or a store access, is processed by the memory system.

The controller 110 is arranged to control the operation of the normal memory buffer 120 and the device memory buffer 130 dependent on the control signals it receives over path 105, so as to ensure that the above-mentioned constraints are abided by. The controller 110 is also responsive to a memory barrier operation to cause both the normal memory buffer 120 and the device memory buffer 130 to be drained before the memory barrier operation is performed. A memory barrier operation is similar to a strongly ordered access, but does not perform any access to memory itself. It is a mechanism used to ensure that all loads and stores preceding it have completed before proceeding to the next instruction in the sequence.

In the above described FIGS. 1 and 2, it will be appreciated that whilst block diagrams have been used to illustrate the functionality of the test system, the test system will typically be embodied by software running on a computer system, and hence each of the elements illustrated in FIGS. 1 and 2 will be embodied in software within the test system.

Figure 4:
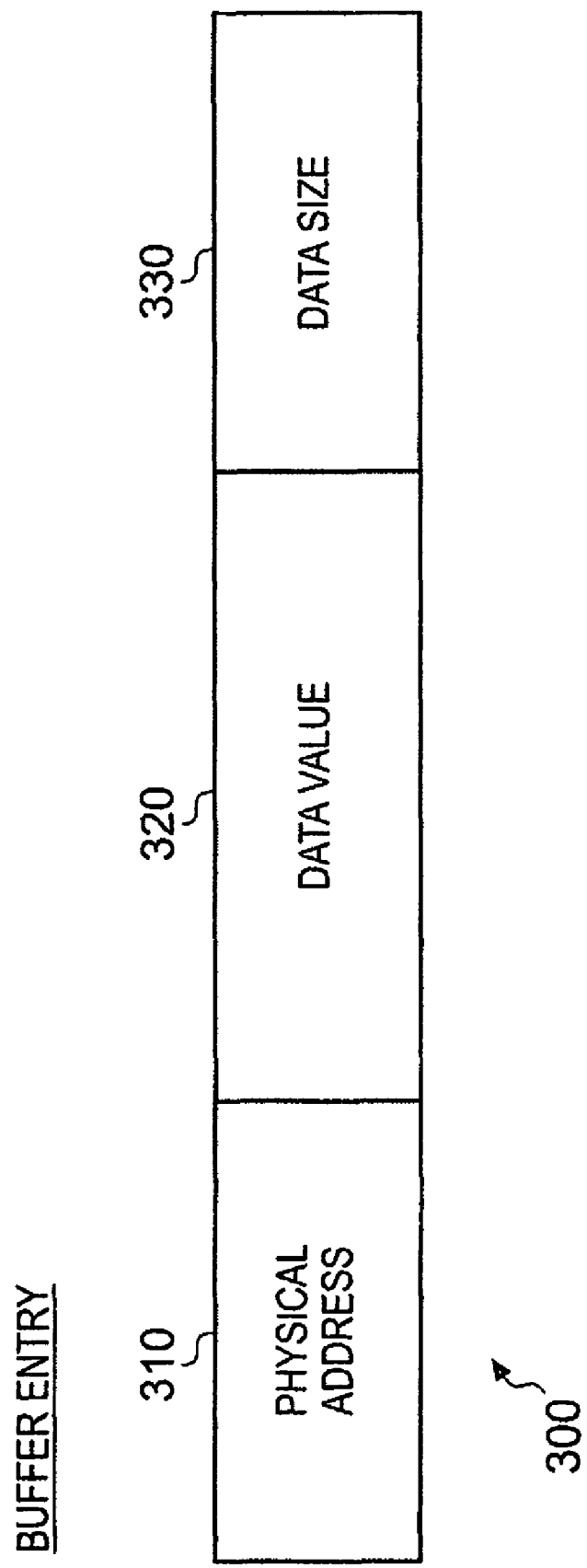
FIG. 4 is a diagram schematically illustrating the information stored within an entry of each store buffer.

Each of the memory buffers 120 and 130 consists of a number of entries, with each entry taking the form illustrated schematically in FIG. 4. Accordingly, it can be seen that each entry will contain a physical address 310, an associated data value 320, and an indication of the data size 330, the data size information indicating for example whether the data value is a byte, a half word (i.e. two bytes), a word (i.e. four bytes), etc in length. With regard to the eviction policy applied by the controller 110 with regard to the contents of the normal memory buffer 120 and the device memory buffer 130, it is important to have the stores sent to the memory system 80 out of order as much as possible over a period of time so that other ISSs get a chance to read the memory and expose software bugs that are relying on consistency models more restrictive than weakly ordered. In order to do this aggressively, one embodiment provides buffers 120 and 130 which have a few tens of entries, and the eviction policy applied by the controller is configurable in order to enable a variety of tests to be performed.

FIG. 5 is a chart illustrating in the left-hand side column a number of different eviction policies which could be supported by a particular embodiment. A first eviction policy implements no store buffers, and hence in this instance all store access requests are routed straight through the store buffer to the shared memory so that they are processed in order. A second eviction policy drains each of the buffers in order, but there is no ordering requirement between the buffers. Hence, an entry in the device memory buffer may be processed before an entry in the normal memory buffer 120 that relates to an earlier access instruction, and vice versa. As mentioned earlier, it is a requirement that the device memory buffer 130, where used, is drained in order, in order to ensure that the earlier mentioned restriction with regard to memory accesses to a device memory region is met.

A third eviction policy maintains the in order draining of the device memory buffer, but with regard to the normal memory buffer allows this to be drained in ascending memory address order. As an alternative, a fourth eviction policy causes the normal memory buffer to be drained in descending memory address order. Finally, a fifth eviction policy enables the normal memory buffer to be drained pseudo randomly.

FIG. 5 indicates the likelihood of the software being tested passing or failing when using these various eviction policies, dependent on the assumptions made within that software regarding memory ordering. If the test software assumes that the memory consistency is strongly ordered, then it will pass the first eviction policy, i.e. where no store buffers are used, but is likely to fail when using any of the other four eviction policies. If the software relies on a TSO consistency model, then it should operate correctly when using either of the first two eviction policies, but is likely to fail when using any of the last three eviction policies. If the test software only relies on a weakly ordered consistency model, then it should pass when using any of the five eviction policies. Clearly if the software is being written to run on an SMP data processing apparatus employing a weakly ordered consistency model, then the aim will be for the test software to execute correctly irrespective of which of the five eviction policies is used by the controller 110 within each store buffer 100.

Figure 6:
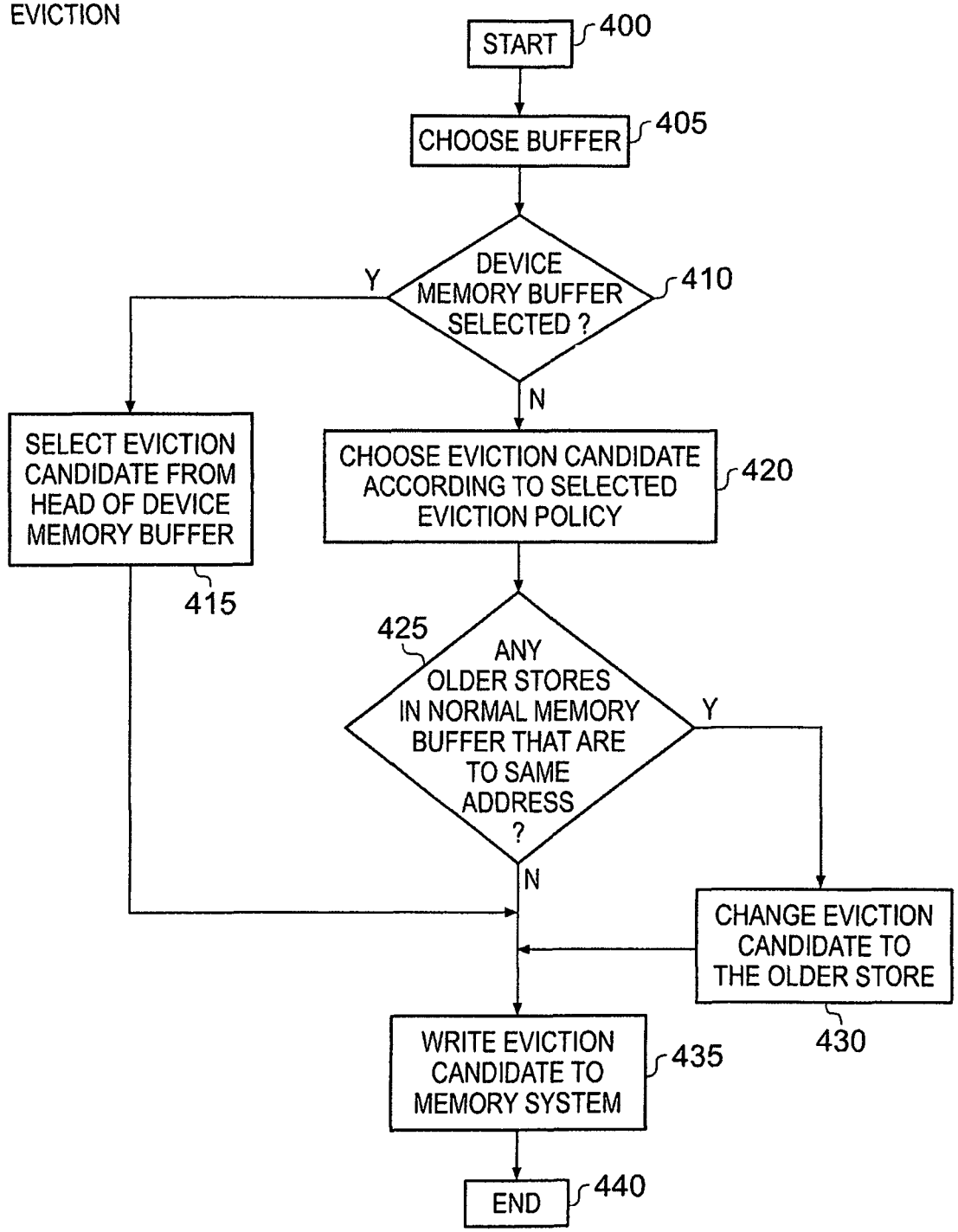

FIG. 6 is a flow diagram illustrating the eviction process performed by the controller 110. As mentioned earlier, this eviction process may be initiated by a variety of events. In particular, the eviction procedure will be initiated on a periodic basis to cause entries to be evicted from the buffers 120, 130, whilst in addition events such as the receipt of a memory access request to a strongly ordered region of memory, or the occurrence of a memory barrier operation, may cause both buffers to be flushed.

The process starts at step 400, whereafter at step 405 one of the buffers 120, 130 is chosen. This selection could be made in a variety of ways, for example using a pseudo random selection, a round-robin selection, or by giving priority to the device buffer 130 (i.e. whilst there are entries in the device memory buffer 130, evict those entries before evicting any entries from the normal memory buffer), etc.

Once a buffer has been selected at step 405, the process proceeds to step 410, where it is determined whether a device memory buffer was selected at step 405. If it was, then the process proceeds to step 415, where the eviction candidate is selected to be that entry at the head of the device memory buffer 130, this being a requirement in order to ensure that accesses to the device memory regions are performed correctly. Then, at step 435, the eviction candidate is written to the memory system 80, whereafter the process ends at step 440.

If at step 410 it is determined that the device memory buffer 130 was not selected, and that accordingly the normal memory buffer 120 was selected, then the process proceeds to step 420 where an eviction candidate is chosen according to a selected eviction policy. As discussed earlier, the eviction policy is configurable, and may for example be chosen to be any one of the five eviction policies discussed earlier with reference to FIG. 5.

Once an eviction candidate has been chosen according to the selected eviction policy, then the process proceeds to step 425, where it is determined whether there are any older store accesses in the normal memory buffer 120 that are directed to the same address. This check is required in order to maintain correctness with regard to operation. If an older store is detected at step 425, then the process proceeds to step 430 where the eviction candidate is changed to be the oldest store access request destined for that address. Thereafter, the process proceeds to step 435 where the eviction candidate is written to the memory system 80, whereafter the process ends at step 440. If at step 425 it is determined that there are no older stores to that address in the normal memory buffer, then the eviction candidate selected at step 420 is the eviction candidate that is written to the memory system at step 435.

By using such an eviction technique, out of order issuance of write access requests can be exercised in an aggressive manner according to a variety of different eviction policies, whilst still ensuring correct operation having regard to the memory ordering type of the portion of the memory system to which each access request is directed.

Figure 7:
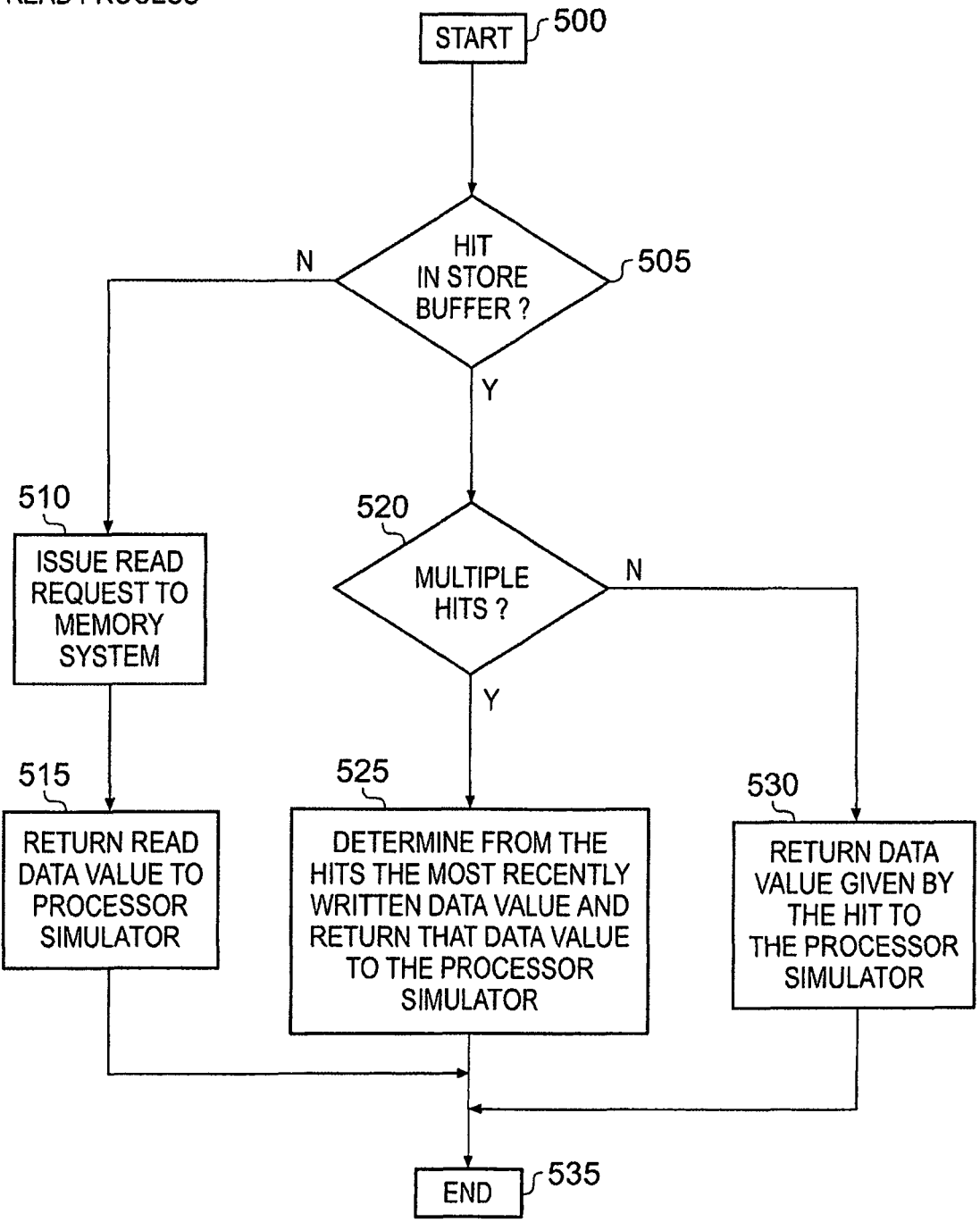
FIG. 7 is a flow diagram illustrating the processing of a read memory access request in accordance with one example, non-limiting embodiment.

FIG. 7 is a flow diagram illustrating the process performed when handling read access requests issued by an ISS and directed to a normal memory region. At step 500, the process starts, whereafter at step 505 it is determined whether a hit is present in the normal memory buffer 120 of the store buffer 100. This check will be performed using the controller 110, with the MMU of the associated ISS sending the necessary control signals to the controller 110 over path 105 to cause a lookup in the normal memory buffer 120 to take place. In the event that a hit is not detected, then the read access request is issued to the memory system 80 at step 510, and in due course the data value read from the memory system will be returned to the ISS at step 515, whereafter the process ends at step 535.

If at step 505 a hit was detected in the normal memory buffer 120, then at step 520 it is determined whether multiple hits were detected. If not, then the store buffer 100 is arranged to return to the ISS the data value given by the hit (for simplicity, this return path is not shown in FIG. 1).

If multiple hits are detected at step 520, then the process proceeds to step 525, where it is determined from those hits which hit relates to the most recently written data value. That most recently written data value is then returned as the data value to the ISS, whereafter the process ends at step 535.

As mentioned earlier, for read access requests relating to a device memory region, the device memory buffer 130 must be drained before the read request is processed. Further, as discussed earlier, for access requests directed to a strongly ordered region, both buffers 120 and 130 must be drained before the access is processed.

FIG. 8 illustrates a simple example of a program sequence which may operate entirely correctly when a strongly ordered consistency model is employed, but which may operate incorrectly when a weakly ordered consistency model is used. In this example, two processors A and B are executing a sequence of instructions in parallel. The sequence executed by processor A includes two store operations, the first store operation storing a particular payload of data to one or more locations within the shared memory 80, and the subsequent store instruction setting a valid bit "PLVALID" to indicate that the payload has been stored and is hence valid. Meanwhile, processor B performs a poll operation to detect the presence of the PLVALID bit being set, and once the PLVALID bit has been set, it then reads the payload data from memory. In a strongly ordered system, this program sequence operates correctly, since it is always ensured that the first store operation performed by processor A will be performed prior to the second store operation. Hence, processor B can rely on the setting of the PLVALID bit to ensure that it can validly then read the payload. However, in a weakly ordered system, the two store operations may be reversed, and in this instance it is clearly not appropriate for processor B to rely on the setting of the PLVALID bit to indicate that it can then proceed to read the payload.

In a typical prior art test system, it would not be possible to detect such a bug, since each ISS inherently operates in a strongly ordered manner, and accordingly the software will always execute correctly. However, through the use of the store buffers 30, 50, 70, it is possible to replicate a weaker consistency model, and to exercise that consistency model aggressively in order to issue a large number of access requests out of order, thus seeking to provoke an occurrence of the bug. This hence provides a very useful tool for detecting the presence of bugs in the software that are due to an incorrect assumption of a particular behaviour of memory ordering which is inappropriate having regard to the data processing apparatus on which the software is intended to run.

Although particular example embodiments have been described herein, it will be apparent that the invention is not limited thereto, and that many modifications and additions may be made within the scope of the invention. For example, various combinations of the features of the following dependent claims could be made with the features of the independent claims.

We claim:

1. A test system for testing software to be run on a data processing apparatus having a plurality of processors configured to share access to a memory system, at least a part of the memory system having a memory ordering type specifying at least one ordering freedom which allows memory access requests to that part to be processed out of order from an original program order, the test system comprising:
    a processor simulator for each processor of the data processing apparatus, each processor simulator being configured to execute a sequence of instructions in program order;
    at least one access buffer unit, each access buffer unit being associated with one of the processor simulators and being configured to receive memory access requests issued by that processor simulator when executing memory access instructions within the sequence of instructions;
    each access buffer unit comprising:
        at least one buffer configured to store memory access requests issued by the associated processor simulator; and
        a controller configured to select an eviction policy, and to apply that selected eviction policy to determine an order in which the memory access requests are output from the access buffer unit to the memory system;
    the eviction policy being selected such that when the controller applies that selected eviction policy, the at least one ordering freedom specified by the memory ordering type of said part of the memory system is exercised in a manner compliant with the memory ordering type but to a degree exceeding that expected within the data processing apparatus.

2. A test system as claimed in claim 1, wherein a predetermined plurality of eviction policies are provided for selection by the controller, so as to allow various types of memory ordering to be implemented including the memory ordering type of said part of the memory system of the data processing apparatus.

3. A test system as claimed in claim 1, wherein said access buffer unit is a store buffer unit and is configured to store selected write memory access requests within the at least one access buffer.

4. A test system as claimed in claim 3, wherein each processor simulator associated with one of said at least one access buffer units is configured, when issuing a read memory access request, to check whether the data value to be read is stored within the associated access buffer unit, and if so to read the data value from the associated access buffer unit rather than issuing the read access request to the memory system.

5. A test system as claimed in claim 1, wherein the memory system has a plurality of parts having different memory ordering types, each of said at least one buffers within each access buffer unit being associated with a particular one of said memory ordering types and being configured to store memory access requests issued to a part of the memory system having that associated memory ordering type.

6. A test system as claimed in claim 5, wherein the memory ordering type of a first part of the memory system is strongly ordered, and no buffer is provided within the access buffer unit for that first part of the memory system, the controller being configured to evict the memory access requests in the at least one buffers before a memory access request to the first part of the memory system is processed.

7. A test system as claimed in claim 5, wherein each access buffer unit comprises a plurality of buffers and the controller is configured when determining a memory access request to be evicted from the access buffer unit to select one of the buffers and to then apply the eviction policy to determine a memory access request to be evicted from that selected buffer, the selection of the eviction policy being dependent on the selected buffer.

8. A test system as claimed in claim 7, wherein a first buffer is associated with a weakly ordered memory ordering type for a normal memory region, and the eviction policy is selected to allow the memory access requests within that first buffer to be output to the memory system according to a variety of out of order schemes consistent with the weakly ordered memory ordering type.

9. A test system as claimed in claim 7, wherein a second buffer is associated with a memory ordering type for a device memory region and the eviction policy requires the memory access requests within that second buffer to be issued in a first-in-first-out order.

10. A test system as claimed in claim 1, wherein said at least one access buffer unit comprises an access buffer unit associated with each processor simulator.

11. A method of testing software to be run on a data processing apparatus having a plurality of processors configured to share access to a memory system, at least a part of the memory system having a memory ordering type specifying at least one ordering freedom which allows memory access requests to that part to be processed out of order from an original program order, the method comprising the steps of:
    (a) for each processor of the data processing apparatus, employing a processor simulator to execute a sequence of instructions in program order;
    (b) providing at least one access buffer unit, each access buffer unit being associated with one of the processor simulators;
    (c) receiving at each access buffer unit memory access requests issued by the associated processor simulator when executing memory access instructions within the sequence of instructions;
    (d) within each access buffer unit:
        (i) storing within at least one buffer memory access requests issued by the associated processor simulator; and (ii) selecting and applying an eviction policy to determine an order in which the memory access requests are output from the access buffer unit to the memory system;

the selection of the eviction policy being such that when the eviction policy is applied, the at least one ordering freedom specified by the memory ordering type of said part of the memory system is exercised in a manner compliant with the memory ordering type but to a degree exceeding that expected within the data processing apparatus.

12. A method as claimed in claim 11, further comprising the step of providing a predetermined plurality of eviction policies, from which the selection at step (d)(ii) is made, so as to allow various types of memory ordering to be implemented including the memory ordering type of said part of the memory system of the data processing apparatus.

13. A method as claimed in claim 11, wherein said access buffer unit is a store buffer unit and at said step (d)(i) stores selected write memory access requests within the at least one access buffer.

14. A method as claimed in claim 13, wherein each processor simulator associated with one of said at least one access buffer units, when issuing a read memory access request, checks whether the data value to be read is stored within the associated access buffer unit, and if so reads the data value from the associated access buffer unit rather than issuing the read access request to the memory system.

15. A method as claimed in claim 11, wherein the memory system has a plurality of parts having different memory ordering types, each of said at least one buffers within each access buffer unit being associated with a particular one of said memory ordering types, said step (d)(i) comprising the step of storing within each buffer memory access requests issued to a part of the memory system having the memory ordering type associated with that buffer.

16. A method as claimed in claim 15, wherein the memory ordering type of a first part of the memory system is strongly ordered, and no buffer is provided within the access buffer unit for that first part of the memory system, at said step (d)(ii) the memory access requests in the at least one buffers being evicted before a memory access request to the first part of the memory system is processed.

17. A method as claimed in claim 15, wherein each access buffer unit comprises a plurality of buffers and said step (d)(ii) comprises the steps, when determining a memory access request to be evicted from the access buffer unit, of selecting one of the buffers and then applying the eviction policy to determine a memory access request to be evicted from that selected buffer, the selection of the eviction policy at said step (d)(ii) being dependent on the selected buffer.

18. A method as claimed in claim 17, wherein a first buffer is associated with a weakly ordered memory ordering type for a normal memory region and the eviction policy is selected at said step (d)(ii) to allow the memory access requests within that first buffer to be output to the memory system according to a variety of out of order schemes consistent with the weakly ordered memory ordering type.

19. A method as claimed in claim 17, wherein a second buffer is associated with a memory ordering type for a device memory region and the eviction policy requires the memory access requests within that second buffer to be issued in a first-in-first-out order.

20. A method as claimed in claim 11, wherein said step (b) comprises providing an access buffer unit for each processor simulator.

21. A non-transitory computer program product storing a computer program Which when executed on a computer implements a test system for testing software to be run on a data processing apparatus having a plurality of processors configured to share access to a memory system, at least a part of the memory system having a memory ordering type specifying at least one ordering freedom which allows memory access requests to that part to be processed out of order from an original program order, the computer program comprising:

a processor simulation code portion configured to provide a processor simulator for each processor of the data processing apparatus, each processor simulator being configured to execute a sequence of instructions in program order;

a buffer unit code portion configured to provide at least one access buffer unit, each access buffer unit being associated with one of the processor simulators and being configured to receive memory access requests issued by that processor simulator when executing memory access instructions within the sequence of instructions;

each access buffer unit comprising:

a buffer code portion configured to implement at least one buffer for storing memory access requests issued by the associated processor simulator; and a controller code portion configured to select an eviction policy and to apply that selected eviction policy to determine an order in which the memory access requests are output from the access buffer unit to the memory system;

the eviction policy being selected such that when the controller code portion applies that selected eviction policy, the at least one ordering freedom specified by the memory ordering type of said part of the memory system is exercised in a manner compliant with the memory ordering type but to a degree exceeding that expected within the data processing apparatus.

* * * * *